Oct. 16, 1934.  C. G. OLSON  1,977,602
LOCK WASHER
Filed March 24, 1932

Inventor:
Carl G. Olson,
By: Cheever, Cox & Moore attys.

Patented Oct. 16, 1934

1,977,602

UNITED STATES PATENT OFFICE 1,977,602

LOCK WASHER

Carl G. Olson, Chicago, Ill., assignor to Illinois Tool Works, Chicago, Ill., a corporation of Illinois Application March 24, 1932, Serial No. 600,928

13 Claims. (Cl. 151—35)

My invention relates generally to lock washers and more particularly to lock washers of the type provided with a plurality of locking teeth annularly disposed about the washer axis.

One of the primary objects of my invention is to provide a washer structure in which a plurality of radial teeth are disposed on opposite sides of the washer stock in position to lockingly engage the work, and in which resilient connecting sections join the tooth sections of the washer in a novel manner.

A further object of my invention is to provide a washer having a plurality of teeth projecting on opposite sides thereof for lockingly engaging the work, a pair of said oppositely disposed teeth formed in a section of the washer stock which is normally warped or flexed oblique to the plane of the washer, said warped sections being connected by thinner washer stock which co-operates with said sections to render them more effective as locking elements.

Still another object of my invention is to provide a washer construction as above set forth having a plurality of connected, normally warped sections, which sections are so arranged that when the washer is clamped against a work piece, said sections will provide a positive abutment or bearing.

My invention also contemplates the provision of a washer in which the connected sections referred to above are warped, flexed or twisted at a greater angle at the inner end thereof whereby to increase the strutting effectiveness across the inner, oppositely disposed corners, thereby rendering the outer parts of said sections more readily yieldable to the clamping action of a nut so as to present the above-mentioned positive bearing without destroying the locking effectiveness of the inner parts of said sections.

Still another object of my invention is to provide a lock washer having connected sections of the type set forth above in which locking edges are disposed on opposite sides of the washer in substantial parallelism with the plane of the washer, the connecting elements extending between the sections serving to constantly urge said sections towards their normal oblique positions when the washer is clamped in position.

The foregoing, and numerous other objects and advantages will be more apparent from the following detailed description, when considered in connection with the accompanying drawing, wherein Fig. 1 is a plan view of a washer which represents one embodiment of my invention;

Figure 6:
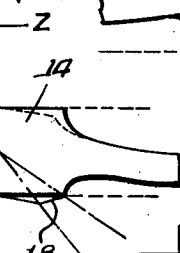
Figure 7:
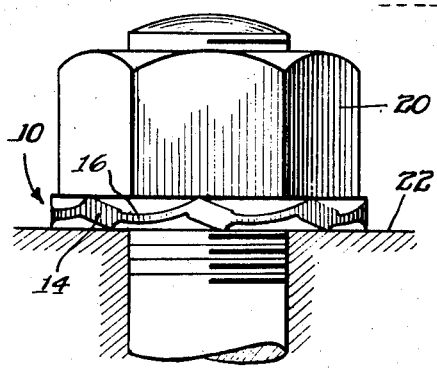
Figure 8:
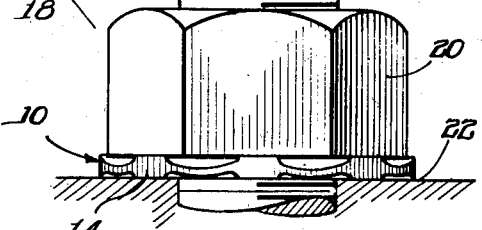

Fig. 6 discloses the final position occupied by the washer section after the nut has been clamped in its final position;

Fig. 7 is a side elevational view disclosing the manner in which the lock washer is applied to the work, prior to the tightening of the clamping nut, and Fig. 8 is a view similar to Fig. 7, disclosing the washer after the nut has been clamped thereagainst.

Referring now to the drawing more in detail wherein like numerals have been employed to designate similar parts throughout the various figures, it will be seen that one embodiment of my invention constitutes a lock washer designated generally by numeral 10. This washer is provided with the usual central aperture 12 and comprises a plurality of radial sections 14 which are joined by resilient connecting sections 16, said connecting sections being of less thickness than the sections 14 hereinafter referred to as locking sections.

The sections 14 are referred to as locking sections by reason of the fact that they are so warped or flexed out of the normal plane of the washer as to present work-engaging edges 18 on opposite sides of the washer in substantial parallelism with the plane of said washer. It will be noted that the circumferential width of the outer portion of the sections 14 denoted by the letter A is greater than the circumferential width B at the inner end of said sections. That is to say, in the particular embodiment of the invention disclosed in the drawing I have shown the work-engaging edges 18 as being radial with respect to the center of the washer, and hence the inner extremities of the sections 14 are less in circumferential width than the outer ends thereof. In order to position the edges 18 in a plane parallel to the plane of the washer, obviously a greater flex or twist must be imparted to the inner ends of the sections 14, as clearly shown in Figs. 3 to 6 inclusive.

Figure 1:
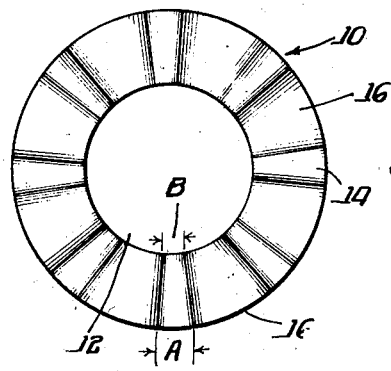
Figure 2:
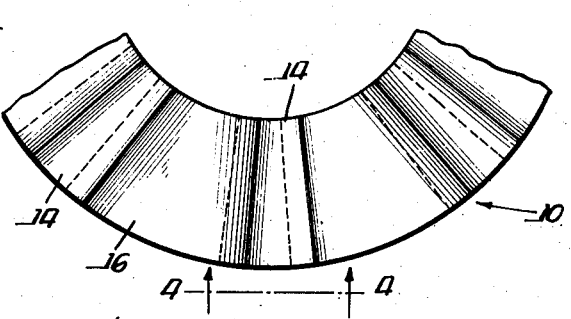
Fig. 2 is an enlarged plan view of the washer of Fig. 1, disclosing more in detail the structural characteristics of the connected locking sections.
Figure 3:
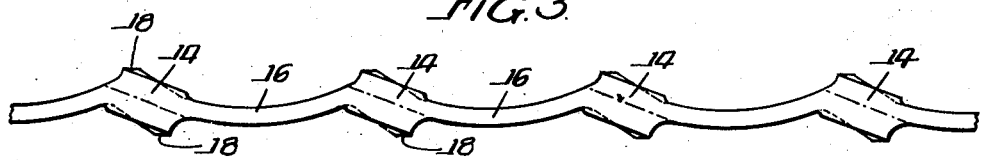
Fig. 3 is a developed edge view of the washer, said view being shown to more clearly illustrate the manner in which the resilient, connecting portions of the washer stock join with the warped locking sections.
Figure 4:
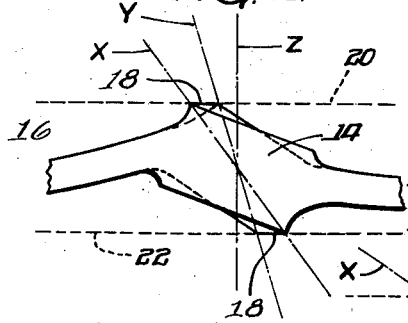
Fig. 4 is an enlarged edge view taken substantially along the line 4—4 of Fig. 2, disclosing the normal warped or flexed position of the section before a clamping nut is tightened thereagainst, the surfaces of the clamping nut and work-piece being disclosed by dotted lines.
Figure 5:
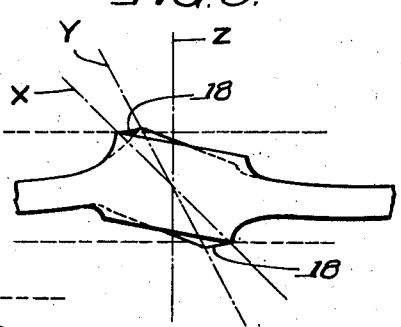
Fig. 5 is a view similar to Fig. 4, disclosing the position occupied by the warped section after the nut has been clamped or tightened to a certain degree against the washer.

Referring to Figs. 4 to 6 inclusive, it will be seen that I have designated the diagonal extending between the edges 18 at their outer extremities by the letter X, and the diagonal extending between said edges at their inner extremities by the letter Y. For the purpose of more clearly discerning the difference in obliquity of the lines X and Y with respect to the horizontal and vertical planes, I have designated a vertical plane passing through the center of the section 14 by a line Z. In Figs. 4 to 6 inclusive the upper horizontal dotted line indicates a clamping nut 20, while the lower dotted line indicates a work-piece 22, said nut and work-pieces being also shown in Figs. 7 and 8.

In Fig. 4 the locking section is shown in a position which it occupies before the nut 20 is clamped thereagainst. In this position it will be seen that the diagonal X which denotes the line of strut across the outer end of the section 14 is disposed at a greater angle to the line Z than the line Y.

In Fig. 5 the nut 20 is shown as having been clamped against the washer and in this position it will be seen that both the lines X and Y have been rotated about a line or center line of twist or warp and that the strutting action indicated by the line Y is still more effective than the strutting action along the line X. In other words, the outer end of the section 14 will more readily yield to the clamping force exerted by the nut 20 than the inner portion of said section. It will also be seen in Fig. 5 that the inner extremity of the locking edges of each lock nut edge 18 is imbedded within both the clamping nut and the work-piece.

In some instances, of course, depending upon the hardness of the materials which are clamped against the washer, the entire edge 18 will imbed itself within the clamping surfaces.

In Fig. 6 I have shown the final position occupied by the section 14 when the nut has been clamped thereagainst with sufficient force to position the outer end of the section 14 in substantial parallelism with the plane of the washer. In this position, this outer end of the section 14 provides a firm backing or bearing for the nut while the inner end of the section has not been completely flattened, due to the fact that the increased strutting action along the line Y causes said inner end to imbed itself within the clamping surface adjacent thereto. It will thus be apparent that when the sections 14 occupy the position shown in Fig. 6, the clamping nut is tightened against a firm bearing surface, and at the same time a portion at least of the locking edges project into the clamping surfaces of the nut and work-piece. In this manner, the nut is positively secured against loosening.

Particular attention is also directed to the function which the resilient connecting sections 16 perform when the clamping nut is tightened against the washer. Obviously the twisting or warping of the section 14 from the position shown in Fig. 4 to the position shown in Fig. 6 must take place against the force exerted by the connecting sections 16. These sections normally tend to retain the sections 14 in the position shown in Figs. 3 and 4, and as the sections are flattened, these resilient connecting sections 16 tend to urge the locking sections 14 in a clockwise direction as viewed in Figs. 4 to 6 inclusive. Thus any tendency for the nut 20 to loosen is counteracted by the action of the connecting sections 16 which tend to urge the locking edges 18 into engagement with their respective adjacent clamping surfaces.

It will also be apparent from the foregoing description that the circumferential cross section of the radial sections 14 presents a rectangular shape or area, the rectangular area at the outer end of the section being longer than the rectangular area at the inner end. Furthermore, the rectangular area at the inner end of the section 14 is more steeply inclined to the plane of the washer than the area at the outer end of said section. By progressively warping the sections in the manner described above, I am able to position the locking edges 18 on opposite sides of the washer stock in planes substantially parallel with the plane of the washer. My improved washer construction may be made by practicing conventional machine shop methods. One method which may be effectively employed to manufacture my device is the method of forging the washer in ring form by first upsetting the extremity of round stock, pushing the stock or bar axially out of the upset end to present a ring, and then pressing said resilient ring so as to produce the sections 14 and 16. In this manner washers can be quickly produced from a single piece of round stock in a very expeditious manner without wasting any stock. Obviously the above method is only one of a number of methods which may be employed to produce my improved washer construction, but the foregoing description will suffice to call attention to the fact that my washer lends itself for economical manufacturing methods.

It will also be apparent from the foregoing description and the disclosure in the drawing that the locking sections 14 are at least twice as thick as the intermediate sections 16. It may be said that the circumferential extension of one section 16 in effect overlaps the circumferential extension in the opposite direction of the adjacent or companion section 16 to form the locking section 14. Thus the left extension of one of the sections 16, as viewed in Figure 3, cooperates with or in effect overlaps the companion right extension to present the locking section 14. It will be apparent, therefore, that while I have disclosed integral locking sections 14 in the present embodiment of the invention, said invention is not limited to this specific integral construction but contemplates any arrangement whereby the adjoining or adjacent extensions of the intermediate thinner sections cooperate to produce a locking section having oppositely disposed work engaging edges resulting from the warping or deflection of the washer stock. This overlapping arrangement of the circumferential extensions of the sections 16 is more clearly illustrated in Figure 3, wherein dot-and-dash lines are employed to designate said extensions.

I am aware that in Fig. 5 of my original Patent No. 1,865,132, Reissue No. 19,116, I have disclosed a conical washer wherein the overlapping portions of the prong margins cooperate to present locking sections having oppositely disposed work engaging edges. It should be noted, however, that my present invention is particularly concerned with flat type washers as distinguished from conical washers. While I am equally aware of the fact that such patents as the patent to Murphy No. 261,947, and the patent to Steinhorst No. 1,816,551 disclose prong margins which cooperatively overlap to produce locking sections, the intermediate portions or connecting sections in such washers are "spanked" and thereby thinned and stretched to produce the overlapping effect. While my present invention contemplates a flat type lock washer wherein the extensions of the connecting sections cooperate to provide locking sections of double thickness, these connecting sections are of uniform cross sectional consistency or thickness as distinguished from washers wherein the prong stock is stretched or drawn and thereby thinned to produce the overlapping margins or locking sections. The locking sections disclosed herein are of uniform thickness or original consistency in radial cross section.

Having thus described my invention, what I claim as new and desire to secure by Letters Patent is:

1. A flat type lock washer including a plurality of locking sections warped with respect to the medial plane of the washer to present oppositely disposed work engaging edges, and connecting sections which are thinner than and extend on opposite sides of each locking section and between said locking sections, each of said connecting sections being of uniform thickness in radial cross section.

2. A lock washer including an annularly formed body provided with a plurality of radially extending locking sections warped so as to present work engaging edges on opposite sides of the washer, and resilient connecting sections extending on opposite sides of and between adjacent locking sections, said locking sections providing a firm bearing for a rotary clamping member tightened thereagainst and having at least one bearing surface adapted to be spaced axially with respect to the connecting sections when the washer is held in position by said clamping member.

3. A lock washer including an annular body provided with a plurality of locking sections warped so as to present work engaging edges, and resilient connecting sections extending on opposite sides of and between said locking sections, at least a portion of said locking sections providing a firm bearing for a rotary clamping member tightened thereagainst and having at least one bearing surface adapted to be spaced axially with respect to the connecting sections when the washer is held in position by said clamping member, the resilient connecting sections serving to oppose such clamping action.

4. A flat type lock washer including a plurality of locking sections warped out of the plane of the washer stock to present work engaging edges lying in planes spaced from and substantially parallel with the plane of the washer stock, and connecting sections which are thinner than and extend between and on opposite sides of said locking sections each of said connecting sections being of uniform thickness in radial cross section.

5. A lock washer including a plurality of locking sections progressively warped out of the plane of the washer stock to present work engaging edges, and connecting sections which are thinner than and extend between said locking sections.

6. A flat type lock washer including a plurality of locking sections of substantially rectangular cross section warped out of the plane of the washer stock to present work engaging edges, and connecting sections which are thinner than and extend between and on opposite sides of said locking sections each of said connecting sections being of uniform thickness in radial cross section.

7. A lock washer including a plurality of radial locking sections warped so as to present work engaging edges lying in planes spaced from and substantially parallel with the plane of the washer stock, the inner ends of the sections being of the same thickness as the outer ends, and resilient connecting means each of substantially uniform thickness extending between and on opposite sides of said locking sections and adapted to oppose a clamping force exerted axially against the washer.

8. A lock washer including a plurality of radial locking sections warped out of the plane of the washer stock so as to present work engaging edges lying in planes spaced from and substantially parallel with the plane of the washer stock, the inner ends of the sections being narrower than the outer ends, and connecting means extending to the inner extremities of said sections for coupling said locking sections, the inner end of each section being warped a greater distance than the outer end thereof.

9. A lock washer including a plurality of radial locking sections warped so as to present work engaging edges lying in planes spaced from and substantially parallel with the plane of the washer stock, said locking sections extending from the inner to the outer rim of the washer, and means extending on opposite sides of each locking section for connecting said locking sections.

10. A lock washer including a plurality of radial locking sections warped out of the plane of the washer stock so as to present work engaging edges lying in planes spaced from and substantially parallel with the plane of the washer stock, and connecting sections interposed between adjacent locking sections and extending on opposite sides of each locking section, said connecting sections having a radial width which is at least equal to the radial width of the locking sections, each of said connecting sections being of uniform thickness in radial cross section.

11. A flat type lock washer including a plurality of locking sections deflected in a manner to present oppositely disposed work engaging edges extending to the outer margin of the washer, and sections of substantially uniform thickness which are thinner than and extend on opposite sides of each locking section and between said locking sections.

12. A flat type lock washer including an annular series of radial sections of resilient stock, each of said sections being substantially uniform in thickness, the circumferential extension of one section cooperatively associated in overlapping relation with the circumferential extension of a companion adjacent section to present a locking section having oppositely disposed work engaging edges extending to the outer margin of the washer for resisting the loosening of a clamping surface tightened thereagainst, said locking sections being at least twice as thick as said radial sections.

13. A lock washer including a plurality of oppositely disposed work engaging edges spaced from and substantially parallel with a medial plane of the lock washer, each edge on one side of said plane being companion to and cooperative with an edge on the opposite side of said plane, the portion of the washer in the vicinity between each pair of cooperative edges extending to the outer margin of the washer, when the work is tightened thereagainst, providing a firm locking section, and sections extending from one locking section to the next locking section being formed of resilient stock, the thickness of said locking sections being at least twice the thickness of said resilient sections extending between said locking sections.

CARL G. OLSON.